(12) United States Patent
Digman

(10) Patent No.: US 8,272,821 B2
(45) Date of Patent: Sep. 25, 2012

(54) PORTABLE TIE-DOWN ANCHOR DEVICE, SYSTEM, AND KIT

(75) Inventor: Donna Digman, Ontario (CA)

(73) Assignee: West Bayberry, LLC, Ontario, CA (US)

( * ) Notice: Subject to any disclaimer, the term of this patent is extended or adjusted under 35 U.S.C. 154(b) by 2 days.

(21) Appl. No.: 13/036,026

(22) Filed: Feb. 28, 2011

(65) Prior Publication Data

US 2011/0211930 A1  Sep. 1, 2011

Related U.S. Application Data

(60) Provisional application No. 61/308,977, filed on Feb. 28, 2010.

(51) Int. Cl.
*B61D 45/00* (2006.01)

(52) U.S. Cl. ...................................................... 410/115

(58) Field of Classification Search .................. 410/101, 410/103, 106, 108, 110, 115, 116; 296/100.16
See application file for complete search history.

(56) References Cited

U.S. PATENT DOCUMENTS

| | | | | |
|---|---|---|---|---|
| 2,372,967 A * | 4/1945 | Joseph | | 410/97 |
| 2,972,490 A * | 2/1961 | Styx | | 410/97 |
| 3,173,539 A * | 3/1965 | Looker | | 206/597 |
| 3,579,641 A * | 5/1971 | Larson | | 2/325 |
| 4,818,162 A | 4/1989 | Zukowski et al. | | |
| 4,850,769 A | 7/1989 | Matthews | | |
| 5,111,554 A | 5/1992 | Sweers | | |
| 5,193,955 A * | 3/1993 | Chou | | 410/100 |
| 5,364,211 A | 11/1994 | Lund | | |
| 5,458,447 A * | 10/1995 | Clason | | 410/100 |
| 5,533,848 A | 7/1996 | Davis | | |
| 5,608,951 A * | 3/1997 | Chou | | 24/302 |
| 5,620,040 A * | 4/1997 | Swanner | | 160/354 |
| 5,623,750 A * | 4/1997 | Nasin et al. | | 24/68 CD |
| 5,800,106 A | 9/1998 | Miller | | |
| 6,439,815 B1 * | 8/2002 | Liu | | 410/106 |
| 6,655,887 B2 | 12/2003 | McDonald | | |
| 6,783,311 B2 | 8/2004 | Sauerwald | | |
| 7,241,093 B2 | 7/2007 | Zuniga | | |
| 7,387,482 B2 | 6/2008 | Kmita et al. | | |

\* cited by examiner

*Primary Examiner* — H Gutman

(74) *Attorney, Agent, or Firm* — Razmig Messerian; Loza & Loza, LLP

(57) ABSTRACT

At least one embodiment pertains to a portable tie-down anchor device, system, and kit comprising: a fabric body having a first end; a first clasp coupled to the first end of the fabric body; a tie-down hardware device coupled to the fabric body and configured to adjust a length of the anchor device; a second clasp coupled to the tie-down hardware device; and a plurality of holes positioned along a length of the fabric body, and wherein the anchor device is configured to secure cargo to a truck bed. The plurality of holes provide additional anchor points for the truck bed, and are adapted to receive an end of a securement device, such as a bungee cord, netting, rope, tarp, or an adjustable strap. The first clasp and the second clasp are each configured to removeably couple to a permanent anchor located in or about the truck bed.

20 Claims, 10 Drawing Sheets

PORTABLE TIE-DOWN ANCHOR DEVICE, SYSTEM, AND KIT

CLAIM OF PRIORITY

The present application for patent claims priority to U.S. Provisional Patent Application No. 61/308,977 entitled "Portable Tie-Down Anchor Device" filed Feb. 28, 2010, the entire disclosure of which is hereby expressly incorporated by reference herein.

BACKGROUND

1. Field

This application generally pertains to a tie-down device, system, and kit for securing cargo in a pickup truck bed. More specifically, it pertains to a portable tie-down anchor device, system, and kit that provides additional, temporary, multiple anchor points around the inside of a pickup truck bed.

2. Background

Pickup trucks are designed to carry various cargo loads in their beds. Various devices have been invented to help stabilize the cargo loads so that they do not shift and move around during transportation, thereby preventing any potential damage to the load and/or the truck itself. Some cargo stabilization devices are constructed from substantially metal components that can be heavy and cumbersome. Moreover, some cargo stabilization devices may require permanent installation of all or part of the device to the truck.

Cargo stabilization devices typically function by providing additional anchor points around the inside wall of a pickup truck bed. Although truck manufacturers usually provide permanent anchors within the truck bed (e.g., the four corners of the interior truck bed), these permanent anchors are few and often inadequate for properly securing a wide variety of cargo loads. Moreover, it may be impractical and aesthetically unpleasing for the truck manufacturer to line the inside of the truck bed with a multitude of permanent anchors.

Much of the prior art devices that attempt to provide securing means in addition to the stock, permanent anchor points are directed at systems that require permanent installation and thus cause lasting alteration of the truck bed. Such designs may be industry specific that cater to a specific profession, and may not consider the ultimate appearance of the truck once the device(s) is installed. Moreover, some of the existing prior art devices were invented before the commercialization of lavish pickup trucks that are primary used for everyday, domestic purposes, yet may also be used for utility purposes at other times. As such, a cargo securing device that substantially alters the aesthetic qualities and appearance of a truck is less desirable to truck owners who may use their truck substantially for domestic purposes. Furthermore, modern pickup trucks may also have non-metallic bed liners installed for utility and aesthetic reasons. Some of the prior art systems may not be compatible for use with trucks having such bed liners.

For example, U.S. Pat. No. 7,387,482 issued Jun. 17, 2008 to Kmita, et al. describes a restraining system for use within a bed of a pickup truck. The system includes a first pair of metal rails disposed on the side walls of the truck bed. A second pair of metal support rails are secured to the forward wall of the truck bed and the interior surface of the rear tailgates of the truck bed. However, this system requires a relatively complex and substantially permanent (fixed) installation of the parts needed to complete assembly.

U.S. Pat. No. 7,241,093 issued Jul. 10, 2007 to Francisco Zuniga describes a securing device consisting of a chain assembly extending around the perimeter of the bed of a truck as well as four permanently attached posts. The device may include a telescoping unit attached to the chain assembly and secured mechanically to the side walls and truck bed floor. However, this system requires bulky posts to be fixedly attached to the corners of the truck bed, and also substantially affect the aesthetics of the truck.

U.S. Pat. No. 6,783,311 issued Aug. 31, 2004 to Kevin S. Sauerwald describes a tie-down cable assembly that is attached mechanically to the vehicle bed. It consists of a steel cable with loops formed for anchor points along the cable itself and is attached to the side walls of the truck bed mechanically. However, this system does not allow the length of the cables to be easily adjusted to accommodate truck beds of various lengths. Moreover, the anchor points are defined by relatively large linear spaces between the folded cable, and therefore any hook attached to said anchor points may experience significant movement causing the cargo to destabilize.

U.S. Pat. No. 5,800,106 issued Sep. 1, 1998 to Bradley A. Miller describes an adjustable magnetic cargo strap system for securing various quantities and sizes of objects within a pickup truck bed without damaging the truck. The device includes a strap, a spring-loaded buckle secured to the first end for removably securing the second end forming a loop. An end magnet is attached to the second end for securing the second end down during use to prevent fluttering of the second end of the strap during driving. However, such a system may not be suitable for trucks having non-metallic bed liners.

U.S. Pat. No. 5,533,848 issued Jul. 9, 1996 to O. Davis describes a system that consists of metal tracks placed about the perimeter of the truck bed. U.S. Pat. No. 5,364,211 issued Nov. 15, 1994 to Gary J. Lund describes a metal anchor bar structure having tie-down fingers projecting from the bar. The tie-down fingers extend from the side wall of the anchor bar exterior of the pickup truck bed. The anchor bar is permanently attached to the top of the pickup truck bed with the fingers hanging out over the sides of the truck bed. U.S. Pat. No. 4,850,769 issued Jul. 25, 1989 to James R. Matthews describes a tie-down device having a movable metal car in a slideable carrier on a stationary track that includes a spring biased latch that is movable vertically. The car operates by inserting the car into one of a plurality of openings on the side track and can be secured in and released from the track. However, O. Davis, Lund, and Matthews each describe a system that requires permanent assembly of one or more components comprising their respective securement devices to the truck bed that may not be easily and quickly removed.

Thus, there is a need for a tie-down anchor device that secures cargo in the bed of a truck that does not require permanent installation of components, such as metal rails along the side of the truck bed, of other components to other portions of the truck. Additionally, there exists a need for the anchor device to not substantially interfere with the aesthetic qualities of the truck with cumbersome and bulky components that can be readily seen. Moreover, there exists a need for the tie-down anchor device to be a portable solution that can be installed to and disassembled from a truck bed quickly and easily on an as needed basis. There also exists a need for the same tie-down anchor device to be constructed from substantially lightweight materials, that are preferably inexpensive to manufacture and ship.

SUMMARY

A portable tie-down anchor device is disclosed that provides additional anchor points around the inside walls of a pickup truck bed. In the preferred embodiment, the device is substantially constructed of a fabric, such as a webbing, made of at least one material, such as nylon, polypropylene, carbon fiber, or other such flexible fabrics that are substantially lighter than most metals. The fabric includes a plurality of holes located at intervals along the length of the fabric, which in some embodiments may be secured with grommets. Additionally, a fabric tightening/shortening device such as a cam buckle may be positioned at one end of the device to adjust the length of the fabric in order to accommodate truck beds of various widths and lengths. Moreover, clasps, such as J-hooks, S-hooks, or carabineers, are installed at both ends of the device to secure the device to existing, permanent anchors of the truck bed.

A tie-down anchor system is disclosed, comprising: a plurality of anchor devices configured to couple to one another to secure cargo to a truck bed, wherein each of the anchor devices includes a fabric body having a first end, a first clasp coupled to the first end of the fabric body, a tie-down hardware device coupled to the fabric body and configured to adjust a length of the anchor device, a second clasp coupled to the tie-down hardware device, wherein the first clasp and the second clasp are each configured to removeably couple to a permanent anchor of the truck bed, and a plurality of holes positioned along a length of the fabric body to provide additional anchor points for the truck bed. In one embodiment, the plurality of anchor devices are coupled to one another via at least one securement device, and the securement device is coupled to at least one of the plurality of holes of each of the plurality of anchor devices to secure the cargo to the truck bed. In another embodiment, at least one of the plurality of anchor devices is configured to extend along a perimeter wall defining a length of the truck bed. In yet another embodiment, at least another one of the plurality of anchor devices is configured to extend along a perimeter wall defining a width of the truck bed. In one embodiment, a first pair of anchor devices of the plurality of anchor devices are configured to extend along a first pair of perimeter walls defining a length of the truck bed, and a second pair of anchor devices of the plurality of anchor devices are configured to extend along a second pair of perimeter walls defining a width of the truck bed. In yet another embodiment, the tie-down hardware device is a cam buckle configured to adjust tension in the fabric body, and the fabric body is a webbing made from at least one of nylon, polyester, polyethylene, ultra-high-molecular-weight polyethylene, polypropylene, carbon fiber, or cotton.

A truck bed tie-down anchor kit is disclosed, comprising: a plurality of truck bed tie-down anchor components packaged together for sale to consumers; and wherein the truck bed tie-down anchor components comprises a first pair of anchor devices configured to couple to one another to secure cargo to a truck bed, wherein each of the anchor devices includes a fabric body having a first end, a first clasp coupled to the first end of the fabric body, a tie-down hardware device coupled to the fabric body and configured to adjust a length of the anchor device, a second clasp coupled to the tie-down hardware device, wherein the first clasp and the second clasp are each configured to removeably couple to a permanent anchor of the truck bed, and a plurality of holes positioned along a length of the fabric body to provide additional anchor points for the truck bed. In one embodiment, the truck tie-down anchor components further comprises a carrying case configured to store the first pair of anchor devices. In another embodiment, the truck tie-down anchor components further comprises at least one securement device configured to couple to at least one of the plurality of holes of each of the anchor devices to secure the cargo to the truck bed. In yet another embodiment, the truck tie-down anchor components further comprises a second pair of anchor devices. In one embodiment, the second pair of anchor devices are shorter in length than the first pair of anchor devices, the first pair of anchor devices configured to extend along a first pair of perimeter walls defining a length of the truck bed, and the second pair of anchor devices are configured to extend along a second pair of perimeter walls defining a width of the truck bed. In another embodiment, the plurality of holes are adapted to receive an end of a securement device. In yet another embodiment, the plurality of holes are secured by grommets, and the tie-down hardware device can be placed into either an open state or a closed state, the open state allowing the length of the anchor device to be adjusted, and the closed state restricting adjustment of the length of the anchor device. In another embodiment, the second clasp is coupled to the tie-down hardware device via a connecting fabric or a connecting piece.

A kit is disclosed, comprising: a packaging housing a plurality of truck bed tie-down anchor components for sale to a consumer; and wherein the plurality of truck bed tie-down anchor components comprises: a securement device; an anchor device configured to secure cargo to a truck bed via the securement device, the anchor device including a fabric body having a first end, a first clasp coupled to the first end of the fabric body, a tie-down hardware device coupled to the fabric body and configured to adjust a length of the anchor device, a second clasp coupled to the tie-down hardware device, wherein the first clasp and the second clasp are each configured to removeably couple to a permanent anchor of the truck bed, and a plurality of holes positioned along a length of the fabric body to provide additional anchor points for the truck bed; and a carrying case configured to store the anchor device and the securement device. In one embodiment, the tie-down hardware device is a cam buckle adapted to adjust tension in the fabric body, and a second end of the fabric body passes through the cam buckle. In another embodiment, the fabric body is a webbing made from at least one of nylon, polyester, polyethylene, ultra-high-molecular-weight polyethylene, polypropylene, carbon fiber, or cotton, and the securement device is one of a chain, a rope, a strap, a bungee cord, a netting, or a tarp. In yet another embodiment, the first clasp is configured to removeably couple to a first permanent anchor point located on an interior perimeter wall of the truck bed, the second clasp is configured to removeably couple to a second permanent anchor point located on the interior perimeter wall of the truck bed, and the tie-down hardware device is further configured to adjust tension in the fabric body so that the anchor device rests substantially against the interior perimeter wall of the truck bed. In one embodiment, the second clasp is coupled to the tie-down hardware device via a connecting fabric or a connecting piece. In yet another embodiment, the plurality of holes are operative to allow connectivity with another anchor device via the securement device.

An anchor device is disclosed, comprising: a fabric body having a first end; a first clasp coupled to the first end of the fabric body; a tie-down hardware device coupled to the fabric body and configured to adjust a length of the anchor device; a second clasp coupled to the tie-down hardware device; and a plurality of holes positioned along a length of the fabric body, wherein the anchor device is configured to secure cargo to a truck bed. In one embodiment, the plurality of holes provide additional anchor points for the truck bed, and the plurality of holes are adapted to receive an end of a securement device. In another embodiment, the first clasp and the second clasp are each configured to removeably couple to a permanent anchor of the truck bed. In yet another embodiment, the anchor device is portable and is configured to removeably couple to the truck bed. In one embodiment, the tie-down hardware device can be placed into either an open state or a closed state, the open state allowing the length of the anchor device to be adjusted, and the closed state restricting adjustment of the length of the anchor device. In yet another embodiment, the tie-down hardware device is a cam buckle adapted to adjust tension in the fabric body. In another embodiment, a second end of the fabric body passes through the tie-down hardware device.

In one embodiment, the first clasp is configured to removeably couple to a first permanent anchor point located on an interior perimeter wall of the truck bed, the second clasp is configured to removeably couple to a second permanent anchor point located on the interior perimeter wall of the truck bed, and the tie-down hardware device is further configured to adjust tension in the fabric body so that the anchor device rests substantially against the interior perimeter wall of the truck bed. In yet another embodiment, the fabric body is a webbing made from at least one of nylon, polyester, polyethylene, ultra-high-molecular-weight polyethylene, polypropylene, carbon fiber, or cotton. In another embodiment, the plurality of holes are operative to allow connectivity with another anchor device via the use of one or more securement devices. In yet another embodiment, the second clasp is coupled to the tie-down hardware device via a connecting fabric.

A portable tie-down anchor system is disclosed, comprising: a plurality of anchor devices each including a fabric body having a first end, a first clasp coupled to the first end of the fabric body, a tie-down hardware device coupled to the fabric body and configured to adjust a length of the anchor device, a second clasp coupled to the tie-down hardware device, wherein the first clasp and the second clasp are each configured to removeably couple to a permanent anchor of a truck bed, and a plurality of holes positioned along a length of the fabric body to provide additional anchor points for the truck bed, wherein the anchor devices are configured to secure cargo to the truck bed. In one embodiment, the tie-down hardware device is a cam buckle configured to adjust tension in the fabric body of each of the plurality of anchor devices. In another embodiment, at least one of the plurality of anchor devices is configured to run along a perimeter wall defining a length of the truck bed. In yet another embodiment, at least another one of the plurality of anchor devices is configured to run along a perimeter wall defining a width of the truck bed. In yet another embodiment, a first pair of anchor devices of the plurality of anchor devices are configured to run along a first pair of perimeter walls defining a length of the truck bed, a second pair of anchor devices of the plurality of anchor devices are configured to run along a second pair of perimeter walls defining a width of the truck bed, and the system further comprises a truck bed covering that couples to the plurality of holes of each of the first pair and second pair of anchor devices.

A truck bed anchor device kit is disclosed, comprising: a first pair and a second pair of anchor devices, wherein each of the anchor devices includes a fabric body having a first end, a first clasp coupled to the first end of the fabric body, a tie-down hardware device coupled to the fabric body and configured to adjust a length of the anchor device, a second clasp coupled to the tie-down hardware device, wherein the first clasp and the second clasp are each configured to removeably couple to a permanent anchor of a truck bed, and a plurality of holes positioned along a length of the fabric body to provide additional anchor points for the truck bed, and wherein the anchor devices are configured to secure cargo to the truck bed; and a carrying case configured to store the first pair and the second pair of anchor devices. In one embodiment, the second pair of anchor devices are shorter than the first pair of anchor devices. In another embodiment, the kit further comprises at least one of a strap, a bungee cord, a netting, or a tarp, and the carrying case is further configured to store the strap, the bungee cord, the netting, and the tarp.

A portable tie down anchor system is also disclosed comprising a plurality of portable tie-down anchor devices. In one embodiment, four portable tie-down anchor devices are utilized to secure cargo in the bed of a truck. Two devices are each installed to the sides of the truck bed, another device is installed at the front of the truck bed near the cabin area, and a fourth device is installed at the rear of the truck bed near the tailgate area. The four devices can be attached to permanent anchors provided by the truck manufacturer in the interior of the truck bed.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

Overview

A portable tie-down anchor device, system, and kit is disclosed that provides additional anchor points around the inside walls of a pickup truck bed (e.g. truck beds, cargo beds, short beds, long beds, etc.). The present portable tie-down anchor device overcomes the shortcomings of the prior art, whose installation may require permanent modifications to the truck bed, and alter the appearance of the truck. A substantial portion of pickup trucks in use today are relatively lavish and are primary used for everyday, domestic purposes, and only occasionally employed for utility purposes such as hauling cargo. Thus, the present portable tie-down anchor device is suitable for such trucks and truck owners because the anchor device disclosed is removeably installed to the truck bed and does not permanently alter the appearance of the truck. The present tie-down anchor device is attached to the truck bed with J-hooks, or other removeably coupled clasps, making installation and removal easy and quick.

Moreover, the tie-down anchor device disclosed herein is portable and light weight. The device will not scratch the paint of the truck bed and is adjustable so that it can be used with truck beds of various sizes and shapes. The device is strong, reliable, inexpensive and easily employed by users who may be inexperienced at securing cargo. The fabric comprising the device can be used in various weather conditions and is resistant to mildew, shrinkage, and fade. While some prior art precludes the use of an anchoring system with a truck having a bed liner, the present device is compatible for use with such trucks.

Portable Tie-Down Anchor Device and System

Figure 1:
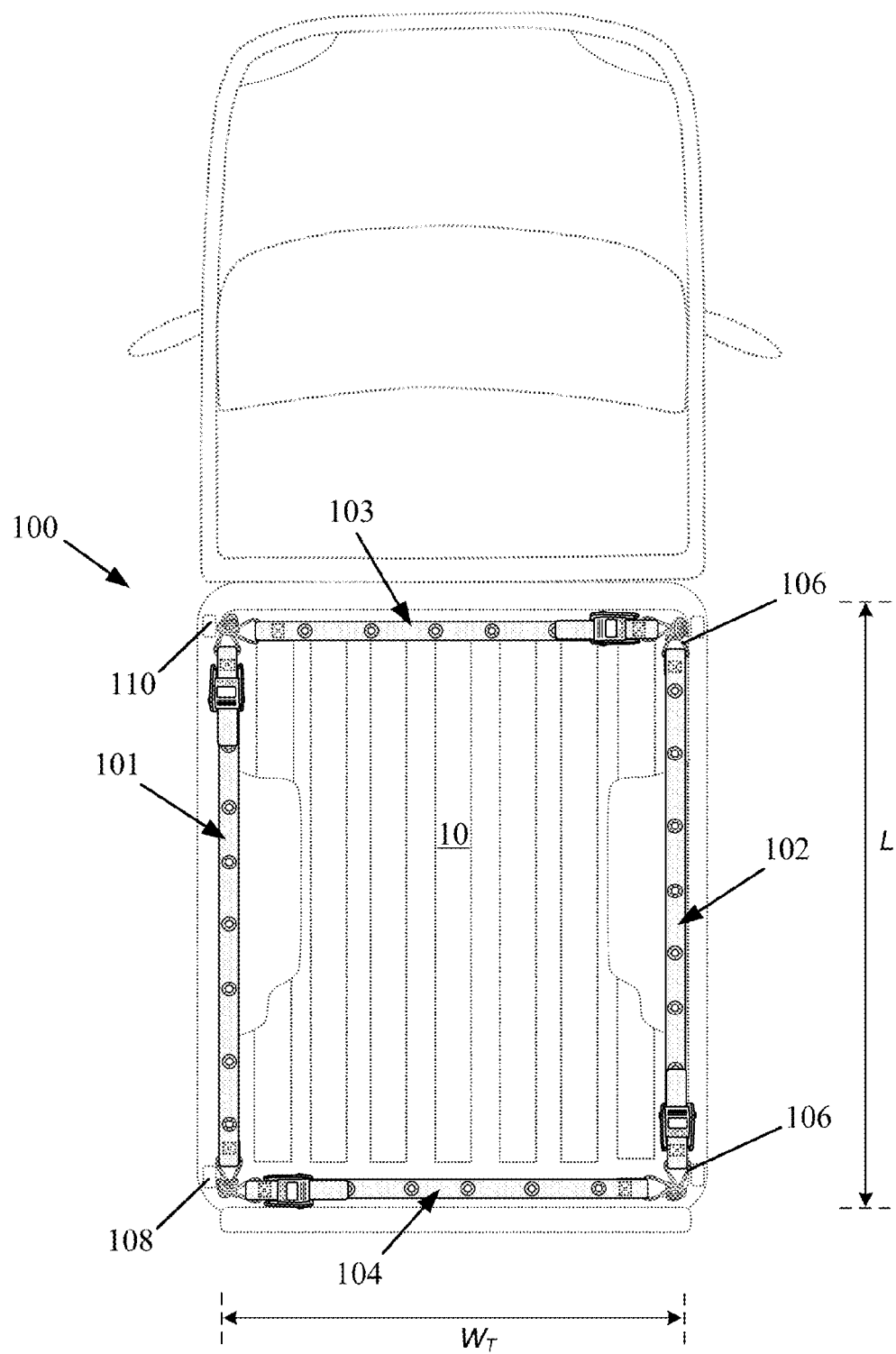
FIG. 1 illustrates a portable tie-down anchor system installed onto a pickup truck bed.

FIG. 1 illustrates a portable tie-down anchor system 100 installed onto a pickup truck bed 10. In one embodiment, the portable tie-down anchor system 100 comprises a plurality of separate tie-down anchor devices 101, 102, 103, 104. For example, two tie-down anchor devices 101, 102 (e.g., a first pair of tie-down anchor devices) may run along near the length (i.e., along a direction from the front of the truck to the back of the truck and thus parallel to bi-directional arrow L shown in FIG. 1) of the truck bed's 10 perimeter. Another two tie-down anchor devices 103, 104 (e.g., a second pair of tie-down anchor devices) may run along near the width (i.e., in a direction parallel to an axle of the truck and thus parallel to bi-directional arrow $W_T$ shown in FIG. 1) of the truck bed's 10 perimeter. Each tie-down anchor device 101, 102, 103, 104 may feature a clasp 106 at each end of the tie-down anchor device that removeably couples to a permanent anchor of the truck bed 10 in order to secure the tie-down anchor device 101, 102, 103, 104 to a perimeter portion of the truck bed 10, for example, a corner of the truck bed 10.

Figure 2:
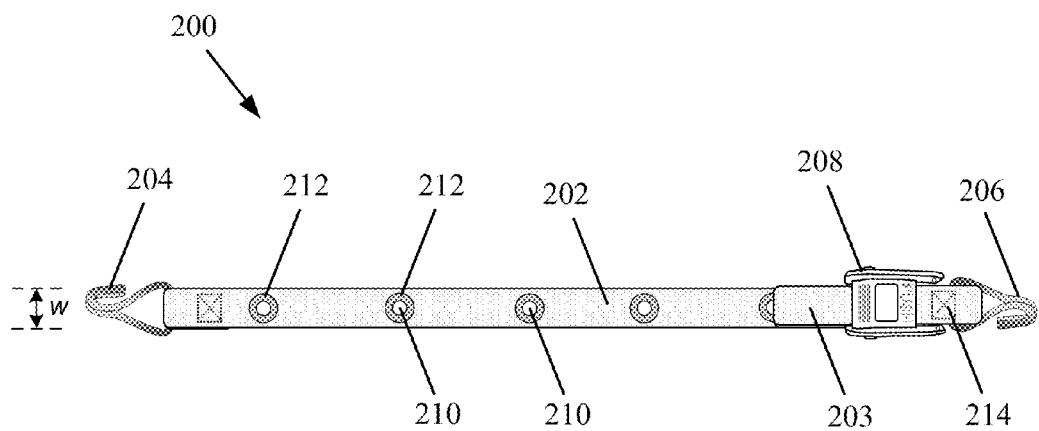
FIG. 2 illustrates a tie-down anchor device.

FIG. 2 illustrates a tie-down anchor device 200 (herein also referred to as an "anchor device," "portable tie-down anchor device," and/or "anchor strap") in closer detail. The anchor device 200 is substantively identical to the tie-down anchor devices 101, 102, 103, 104 used in the tie-down anchor system 100 illustrated in FIG. 1. Referring to FIG. 2, in one embodiment, the anchor device 200 may be comprised of a fabric body 202, a first clasp 204, a second clasp 206, a fabric tie-down hardware device 208, and a plurality of holes 210.

The fabric body 202 may be a webbing (e.g., woven fabric) comprised of at least one strong, durable, yet flexible material such as, but not limited to, nylon, polyester, polyethylene, ultra-high-molecular-weight polyethylene, polypropylene, carbon fiber, Kevlar®, cotton, and/or flax. In one embodiment, the fabric body 202 is comprised of a webbing that can withstand high tension forces, for example, in excess of 1,000 lbs. In another embodiment, the fabric body 202 may be treated with ethylene oxide, thymol, and/or orthophenyl phelol for resistance to mildew and mold so that it can be used in a variety of environments, including wet or dry.

Attached to one end (e.g., a first end) of the anchor device 200 is a first clasp 204, and attached to the other end (e.g., a second end) of the anchor device 200 is a second clasp 206. In one embodiment, the first clasp 204 is coupled to the one end (e.g., a first end) of the fabric body 202. In another embodiment, the second clasp 206 is coupled to the tie-down hardware device 208 via a connecting fabric 214. In yet another embodiment, the second clasp 206 is coupled directly to the tie-down hardware device 208. In one embodiment, the connecting fabric 214 may be composed of the same materials/fabric that make up the fabric body. In another embodiment, the connecting fabric 214 may be a connecting piece that is made of a plastic or metal component and serves to couple the second clasp 206 to the tie-down hardware device 208.

In one embodiment the first and second clasps 204, 206 are "J"-hooks. However, other types of clasps or fasteners can be used instead that similarly allow the first and second ends of the anchor device 200 to be removeably coupled to a permanent anchor 302 of a truck bed. For example, "S"-hooks, carabiners, including sprung carabiners, locking carabiners, and lever-operated opening rings may be used instead of "J"-hooks.

Along the length of the fabric body 202 lie a plurality of holes 210 suitable for allowing other securement devices, such as, bungee cords, rope, straps, nets, tarps, etc. to attach thereto. In the preferred embodiment, the perimeter of the holes 210 may be secured using grommets 212 by, for example, inserting grommets 212 into the holes 210. The grommets 212 may be made of a metal or metal alloy, such as, aluminum, steel, iron, titanium, etc. In other embodiments, the grommets 212 may be ceramic, plastic, or comprised of some other hard, durable non-metal material. In one embodiment, the plurality of holes 210 may be interspaced equally apart along the length of the fabric body 202. For example, the holes 210 may be spaced apart at intervals ranging anywhere from two (2) to eighteen (18) inches. In another embodiment, the holes 210 may be spaced apart at irregular intervals.

In another embodiment, pairs of holes may be spaced apart at regular intervals along the length of the fabric body 202. In such a configuration, the spacing between the two holes that comprise the pair may be small, for example, one (1) to four (4) inches, but the spacing between each successive pair of holes may be longer, for example, six (6) to twenty (20) inches. The number of holes 210 shown in FIG. 2 is merely illustrative. In practice the anchor device 200 may have one or more holes 210. Moreover, the holes 210 and grommets 212 shown in FIG. 2 as being circular is merely illustrative. In practice, the holes 210 and any associated grommets 212 can be any shape (square, triangular, rectangular, oval, hexagonal, or other polygon shape), and have a diameter suitable to allow attachment of other securement devices (e.g., rope, straps, bungee cords, nets, tarps, etc.), or the clasps of such devices, thereto.

In one embodiment, the holes 210 may have diameters that vary from one another along the length of the fabric body 202. In some embodiments, the diameter of the holes 210 may range from 0.1 inches to 2 (two) inches in diameter. In some embodiments, the width w of the fabric body 202 may range from 0.5 inches to 10 (ten) inches. In some embodiments, the center point of the holes 210 are centered along the width w of the fabric body 202. In some embodiments, the holes 210 have a diameter that is greater than one half of the width w of the fabric body 202. In such embodiments, it may be even more critical that the holes 210 be secured with grommets 212 because the diameter of the holes begin to approach the width w of the fabric body 202, making it easier for an unsecured, grommet-less hole to tear under forces imparted by a securement device's clasp. In yet other embodiments, the holes 210 have a diameter that is less than one half of the width w of the fabric body 202.

The anchor device 200 also features a fabric tie-down hardware device 208 that allows a user to adjust the length of the anchor device 200 by increasing or decreasing the amount of slack associated with, for example, the fabric body 202. In one embodiment, one end 203 of the fabric body 202 passes through and out of the tie-down hardware device 208 in such a manner as to allow a user to adjust the length of the fabric body 202 by increasing or decreasing the length of the end portion 203 of the fabric body 202. By tightening the fabric body 202 (i.e., increasing the tension in the fabric body 202) the user is able to have the anchor device 200 press tightly against a perimeter wall (e.g., an interior wall) of the truck bed 10. For example, as illustrated in FIG. 1, where a first clasp of the anchor device 101 is attached to a permanent anchor located in a corner 108 of the truck bed 10, and a second clasp of the anchor device 101 is attached to another permanent anchor located in an opposite corner 110 of the truck bed 10, the tie-down hardware device 208 may be used to tighten/shorten the fabric body 202. This allows the anchor device 200 to firmly and tightly press against an interior or exterior wall of the truck bed 10, and properly fit the dimensions of the truck bed 10. In this fashion, the anchor device 200 accommodates truck beds of various widths and lengths.

Figure 3:
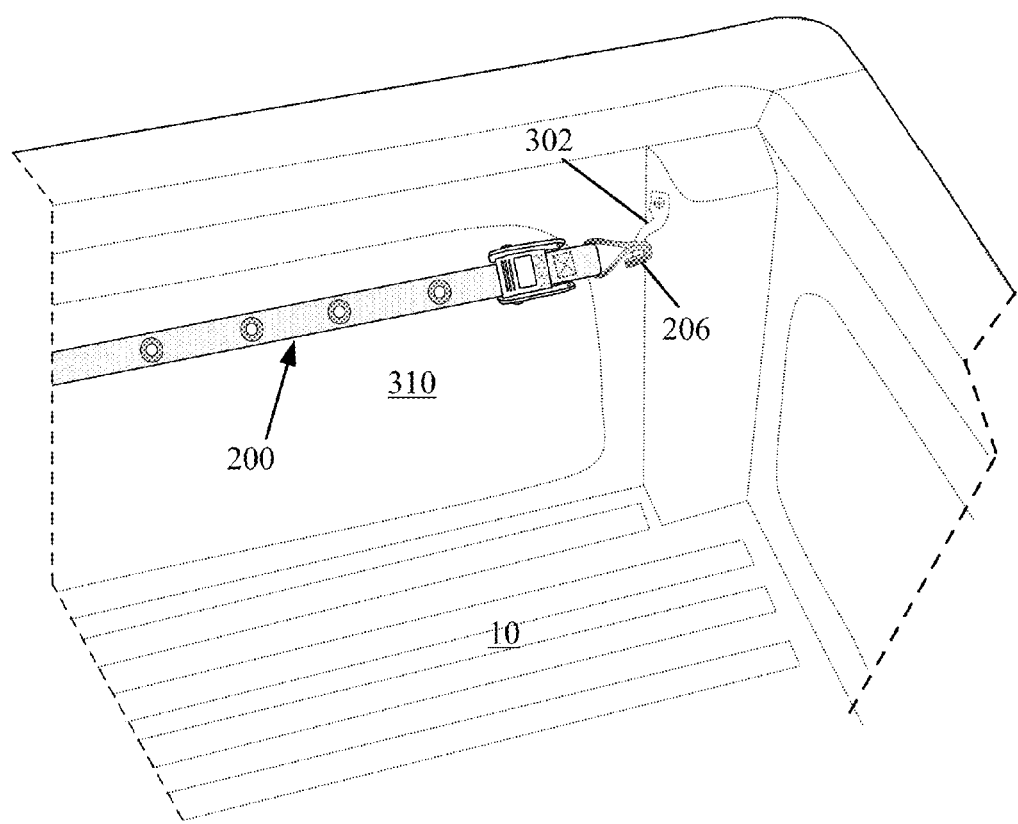
FIG. 3 illustrates a portion of a truck bed and a perimeter wall of the truck bed.

FIG. 3 illustrates a portion of a truck bed 10 where the second clasp 206 of an anchor device is removeably coupled to a permanent anchor 302 of the truck bed 10. Most trucks are equipped stock with permanent anchors, usually located proximate to at least four of the corners of the truck bed; sometimes, more anchors are spaced there between. The permanent anchors may be located within the cavity of the truck bed 10 or in some cases, along the outside edge of the perimeter of the truck bed 10. Notwithstanding the location of the truck bed's 10 permanent anchors, the first clasp 204 is designed to removeably, yet securely, couple to the permanent anchor 302, thereby securing the first end of the anchor device 200 to a portion of the truck bed 10. Similarly, the first clasp 204 allows the first end of the anchor device 200 to removeably, yet securely, couple to another permanent anchor of the truck bed 10, for example, located at an opposite corner of the truck bed 10. This allows the anchor device 200 to press substantially against one of the perimeter walls 310 of the truck bed 10 when tightened appropriately.

Figure 4:
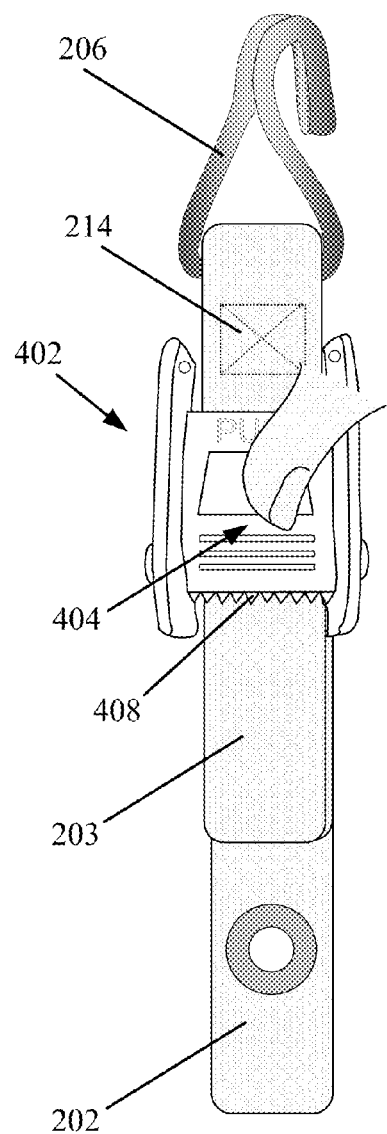
FIG. 4 illustrates a cam buckle in an "open" state.
Figure 5:
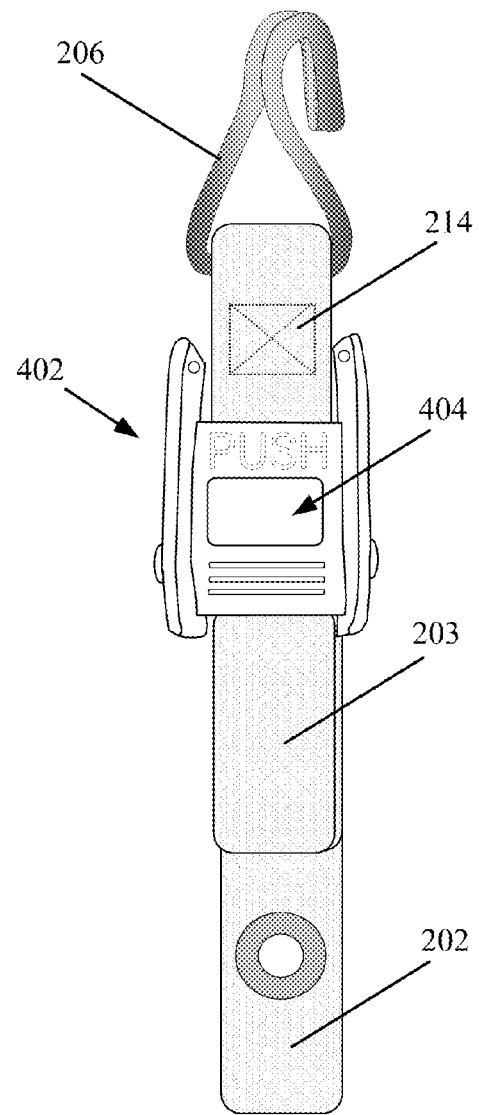
FIG. 5 illustrates a cam buckle in a "closed" state.

In one embodiment, the tie-down hardware device 208 may be a cam buckle 402 (e.g., a snap buckle, or a threaded buckle) as illustrated in FIGS. 4 and 5. FIG. 4 illustrates that the cam buckle 402 may have an "open" position (e.g., "open state") that freely allows the end portion 203 of the fabric body 202 to pass through the cam buckle 402 to allow adjustment of the length of the anchor device 200. Thus, tension may be added to the fabric body 202 by pulling the end portion 203 of the fabric body 202 through the cam buckle 402 until the necessary tension is achieved. The cam buckle 402 can be placed into the open position by, for example, depressing a lever 404 (e.g., an actuator) in one direction to raise the lever's 404 gripping teeth 408 up off of the fabric body 202 and/or end portion 203 of the fabric body 202. In one embodiment, one end of the connecting fabric 214 is fixedly attached to the tie-down hardware device 208. Another end of the connecting fabric 214 may be fixedly attached to the second clasp 206. In another embodiment, the second clasp 206 may be coupled directly to the tie-down hardware device 208 without a connecting fabric 214 in between.

FIG. 5 illustrates that the cam buckle 402 may have a "closed" position (e.g., "closed state") that locks the length of the anchor device 200 in place. The cam buckle 402 can be placed into the closed position by, for example, depressing the lever 404 in another direction in order to press the lever's 404 gripping teeth 408 tightly against the fabric body 202 and/or end portion 203 of the fabric body 202 thereby inhibiting its movement. In other embodiments, the tie-down hardware device 208 may be a ratchet fastener where a ratcheting mechanism is employed to take up the slack of the fabric body 202 to achieve the desired fabric body 202 tension and anchor device 200 length. In yet another embodiment, the tie-down hardware device 208 may be an "over-center" fastener where the act of closing the lever 404 increases the tension in the fabric body 202.

Figure 6:
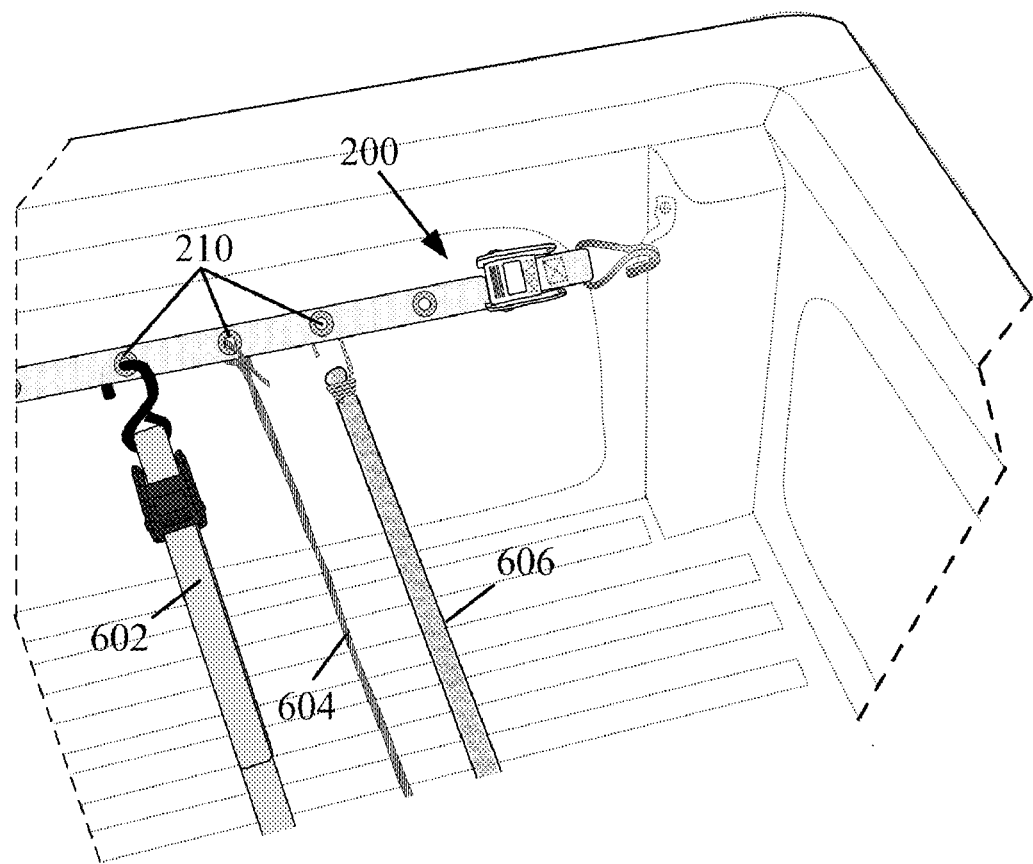
FIG. 6 illustrates how other securement devices, for example, a strap, a rope, and a bungee cord may be attached to the holes of the anchor device.

FIG. 6 illustrates how other securement devices, for example, a strap 602, a rope 604, and a bungee cord 606 may be attached to the holes 210 of the anchor device 200. These securement devices may be attached at strategic hole 210 locations along one or more anchor devices 200 along the perimeter of the truck bed 10 in order to secure cargo.

Figure 7:
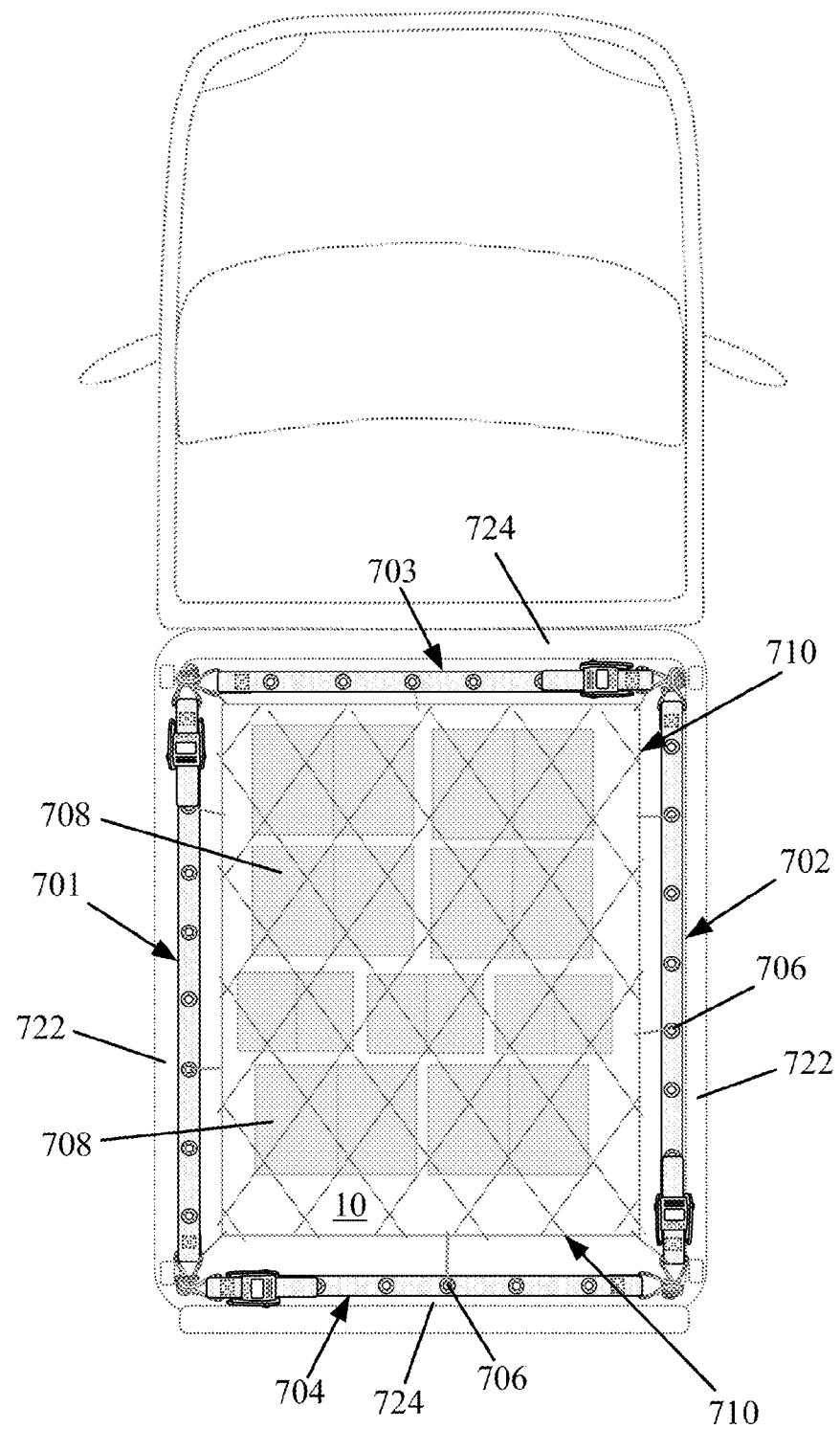
FIG. 7 illustrates how a cargo netting having hooks may be attached to the holes of the anchor devices to secure cargo in the truck bed.
Figure 8:
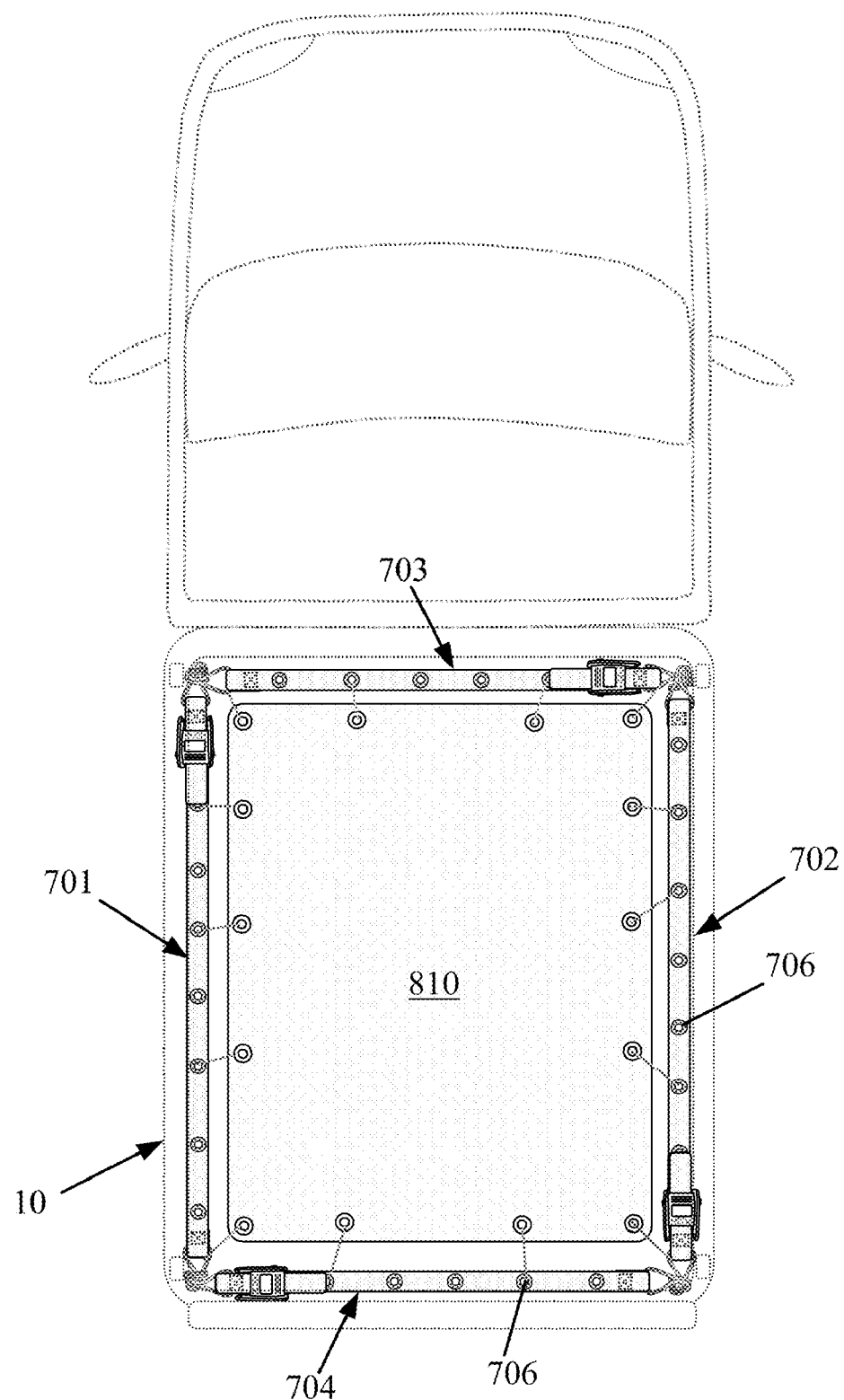
FIG. 8 illustrates how a truck bed covering, such as a tarp, having hooks may be attached to the holes of the anchor devices to secure cargo in the truck bed.
Figure 9:
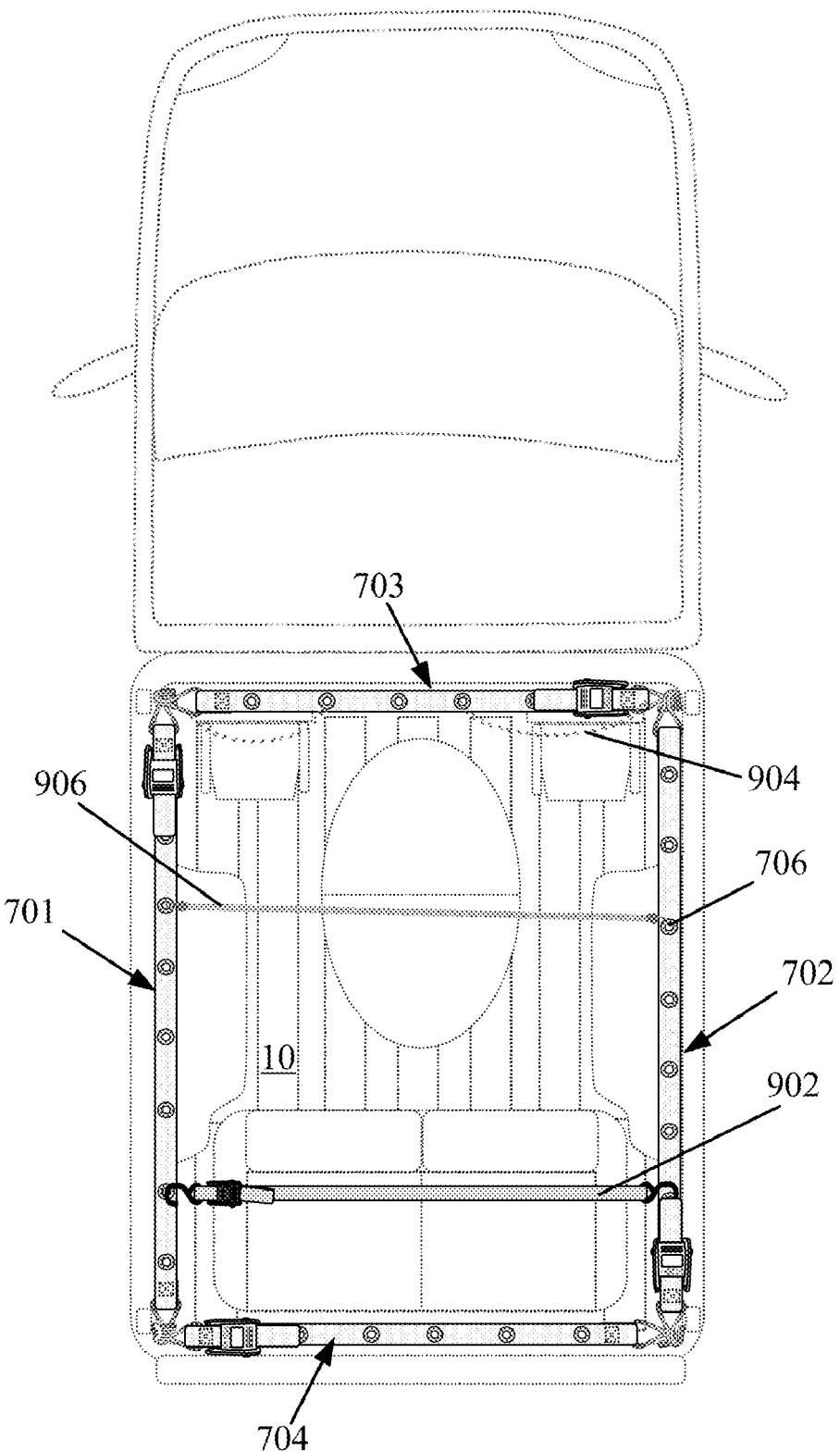
FIG. 9 illustrates how other securement devices, such as a strap, chains, and a bungee cord may be attached to the holes of the anchor devices in order to secure various types of cargo to the truck bed.

FIGS. 7-9 illustrate four anchor devices 701, 702, 703, 704 that comprise a portable tie-down anchor system 700 installed onto a pickup truck bed 10. Two anchor devices 701, 702 run/extend along near the length of the truck bed's 10 perimeter, while another two anchor devices 703, 704 run/extend along near the width of the truck bed's 10 perimeter. As discussed above with reference to FIGS. 2 and 3, each anchor device 701, 702, 703, 704 is secured to permanent anchors of the truck bed 10 via clasps at the ends of the anchor devices 701, 702, 703, 704. The anchor devices 701, 702, 703, 704 are adjusted in length and tension using tie-down hardware devices (as discussed above with reference to FIGS. 4-5) so that the anchor devices 701, 702, 703, 704 rest tightly and firmly against the perimeter walls of the truck bed 10 as shown, for example, in FIGS. 7-9. Thus, a first pair of anchor devices 701, 702 are configured to run/extend along a first pair of perimeter walls 722 defining a length of the truck bed 10, a second pair of anchor devices 703, 704 are configured to run/extend along a second pair of perimeter walls 724 defining a width of the truck bed 10.

FIG. 7 illustrates how a cargo netting 710 having hooks, or other securing means, may be attached to the holes 706 and/or clasps of the anchor devices 701, 702, 703, 704 to secure cargo 708 in the truck bed 10.

FIG. 8 illustrates how a truck bed covering 810, such as a tarp, having hooks, or other securing means, may be attached to the holes 706 and/or clasps of the anchor devices 701, 702, 703, 704 to secure cargo in the truck bed 10.

In one embodiment, a user may choose to use the anchor devices 701, 702, 703, 704 and truck bed covering 810 not to necessarily secure cargo, but instead to cover the truck bed 10. A user may choose to do this to keep the truck bed 10 clean and also help improve the aerodynamic characteristics of the truck. Specifically, when the truck is moving forward air flows over the front and top of the truck. Then, it may careen into the hollow bowl-shaped cavity of the truck bed 10 creating significant drag that slows the truck down and wastes gas. The combination of the anchor devices 701, 702, 703, 704 and the tarp 810 substantially prevent such airflow from entering the truck bed 10 thus reducing drag. Thus, installation of a truck bed covering 810 may reduce the overall drag coefficient of the truck and/or truck bed. In some embodiments, the truck bed covering 810 may be comprised of a durable fabric and may be a tarp. In other embodiments, the truck bed covering 810 may be comprised of a rigid material such as fiber glass or carbon fiber. Thus, FIG. 8 also discloses a system comprising anchor devices 701, 702, 703, 704 and the truck bed covering 810 that helps improve the aerodynamic characteristics of a truck by reducing drag caused by air flowing into the truck bin 10 while the truck is in motion.

FIG. 9 illustrates how securement devices, such as a strap 902, chains 904, and a bungee cord 906 may be attached to the holes 706 and/or clasps of the anchor devices 701, 702, 703, 704 in order to secure various types of cargo to the truck bed 10.

Figure 10:
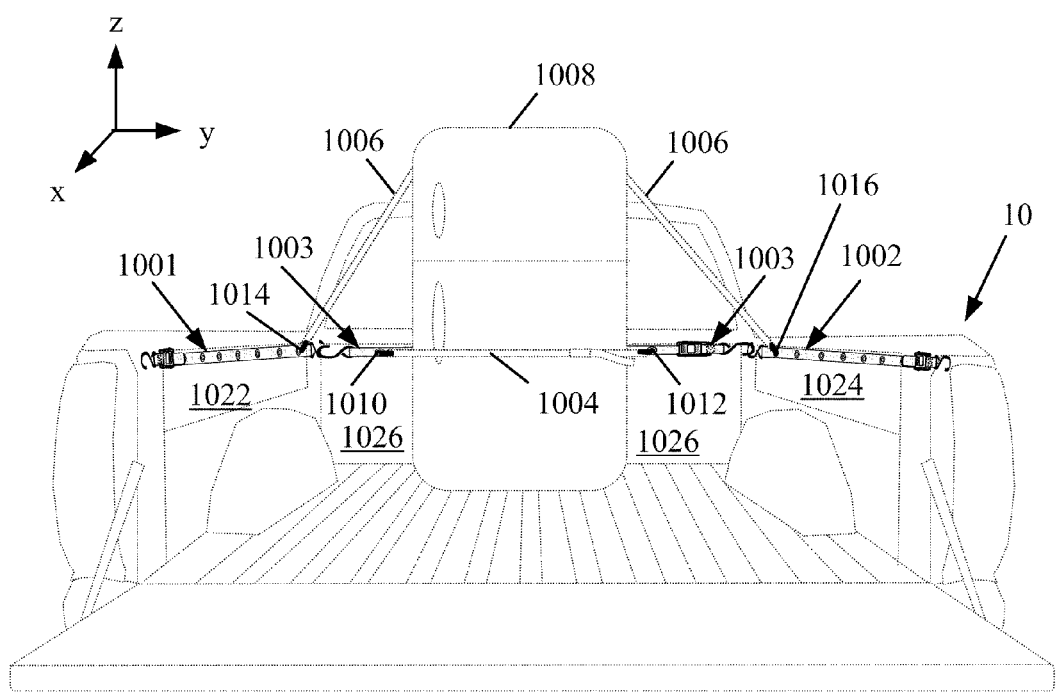
FIG. 10 illustrates a view of the back of a truck featuring a tie-down anchor system comprising three anchor devices installed to a truck bed.

FIG. 10 illustrates a view of the back of a truck featuring a tie-down anchor system 1000 comprising three anchor devices 1001, 1002, 1003 installed to a truck bed 10. One anchor device 1001 is attached to permanent anchors of the truck bed 10 so that the anchor device 1001 is secured against an interior, left perimeter wall 1022 of the truck bed 10. Another anchor device 1002 is attached to permanent anchors of the truck bed 10 so that the anchor device 1002 is secured against an interior, right perimeter wall 1024 of the truck bed 10. Another anchor device 1003 is attached to permanent anchors of the truck bed 10 so that the anchor device 1003 is secured against an interior, cabin-side perimeter wall 1026 of the truck bed 10. The three anchor devices 1001, 1002, 1003 along with two other securement straps 1004, 1006 help secure a cargo load 1008.

Specifically, one end of a securement strap 1004 attaches to a hole 1010 of one of the anchor devices 1003. Another end of the securement strap 1004 attaches to another hole 1012 of the anchor device 1003. The securement strap 1004 may then be tightened to the appropriate tension to secure the cargo 1008 substantially in the x-direction. One end of another securement strap 1006 attaches to a hole 1014 of another anchor device 1001. The other end of the securement strap 1006 attaches to a hole 1016 of yet another anchor device 1002. The securement strap 1006 may then be tightened to the appropriate tension to secure the cargo 1008 substantially in the y-z plane. In this fashion, three anchor devices 1001, 1002, 1003 may be used to secure cargo to the truck bed 10. In other embodiments, one or two anchor devices 200 may be used to secure cargo to the truck bed 10.

Truck Bed Anchor Device Kit

Figure 11:
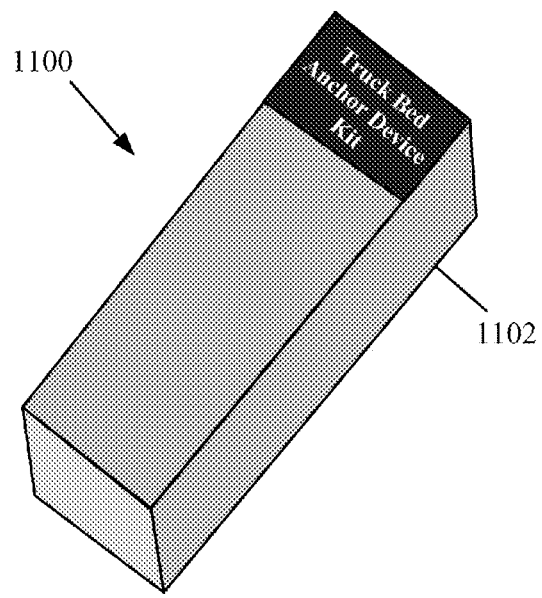
FIG. 11 illustrates a truck bed tie-down anchor kit having truck bed tie-down anchor components in a packaging for sale to a consumer.
Figure 12:
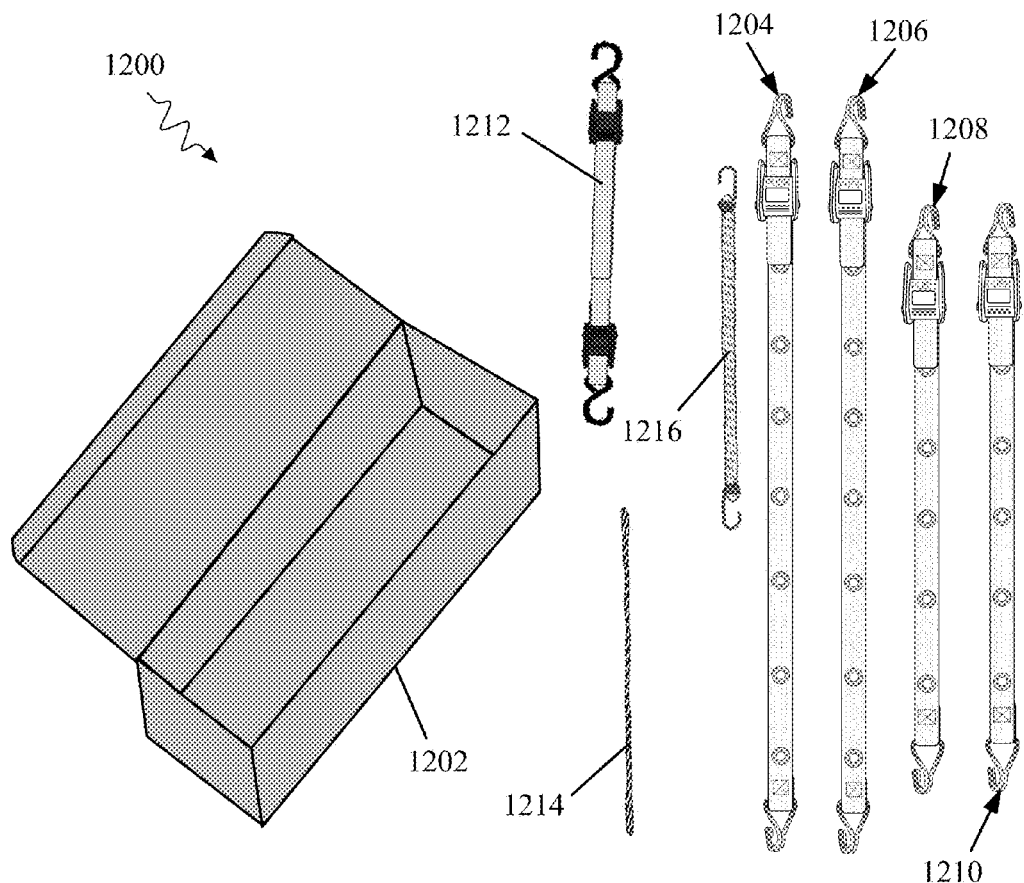
FIG. 12 illustrates an example of some of the truck bed tie-down anchor components that may be included in the truck bed tie-down anchor kit.

FIG. 11 illustrates a truck bed anchor device kit 1100 (e.g., "truck bed tie-down anchor kit", and "kit") that houses one or more truck bed tie-down anchor components in a packaging 1102 for sale (e.g., retail sale) to consumers. FIG. 12 illustrates, for example, some of the possible truck bed tie-down anchor components 1200 of the truck bed anchor device kit 1100. The truck bed tie-down anchor components 1200 of the kit 1100 may comprise, in one embodiment, a carrying case 1202, a first pair of anchor devices 1204, 1206, and a second pair of anchor devices 1208, 1210. In some embodiments, the kit 1100 may also comprise one or more straps 1212, one or more pieces of rope 1214, and one or more bungee cords 1216. In some embodiments, the kit 1100 may also include a netting 710 and/or a tarp 810. In one embodiment, the second pair of anchor devices 1208, 1210 are shorter in length compared to the first pair of anchor devices 1204, 1206. In such an embodiment, the first pair of anchor devices 1204, 1206 are configured to engage with permanent anchor points of the truck bed so as to run/extend along the length of the truck bed (i.e., along a direction from the front of the truck to the back of the truck) since the length of the truck bed is typically longer than the width. The second, shorter, pair of anchor devices 1208, 1210 are configured to engage with permanent anchor points of the truck bed so as to run/extend along the width of the truck bed (i.e., in a direction parallel to an axle of the truck).

The carrying case 1202 is configured to store the first and second pairs of anchor devices 1204, 1206, 1208, 1210, and any other securement devices, such as, the strap(s) 1212, rope 1214, the bungee cord(s) 1216, netting 710, and/or tarp 810. The carrying case 1202 may be a sturdy container with a handle, or a flexible bag such as a duffle bag. The carrying case 1202 allows for a portable tie-down anchor system solution since all the necessary components of the system can be easily transported into and out of the truck. For example, a user can store the carrying case 1202 and its contents (e.g., the first and second pairs of anchor devices 1204, 1206, 1208, 1210, and other securement devices) in the truck bed 10 or the cabin of the truck and access its contents on an as needed basis.

The present portable tie-down anchor device, system, and kit allow cargo to be secured for a wide range of activities, such as, but not limited to, hauling: lumber, yard waste, refrigerators, furniture, boxes, recreational gear, lawn mowers, boxes, etc., or a combination of such items. The device, system, and kit can be also be used to tether a plurality of dogs or livestock in the truck bed. They can also provide additional, multiple tie-down anchor points around the entire perimeter of the interior truck bed, or only on those sides of the truck bed that are needed to contain a particular load.

The present portable tie-down anchor device, system, and kit is compatible for use in truck beds with or without a truck bed liner. They provide a simple cargo securement solution that is installed quickly and easily without the need for tools, or the added cost of professional installation. Furthermore, since the anchor device is constructed, among other things, from fabric, it is relatively inexpensive to manufacture and ship compared to prior art solutions that are substantially made from metal components. Accordingly, present portable tie-down anchor device, system, and kit features portability, compactness in size for easy storage, and the easy installation serves to provide an efficient means for truck owners that casually transport cargo on a moderate or occasional basis.

One or more of the components and functions illustrated in the figures may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A tie-down anchor apparatus, comprising:
  a plurality of anchor devices configured to removeably couple to one another to secure cargo to a truck bed, and at least one of the plurality of anchor devices is configured to extend along a perimeter wall defining a length or a width of the truck bed,
    wherein each of the anchor devices includes
      a fabric body having a first end,
      a first clasp coupled to the first end of the fabric body,
      a tie-down hardware device coupled to the fabric body and configured to adjust a length of the fabric body,
      a second clasp coupled to an end of the anchor device, wherein the first clasp and the second clasp are each configured to removeably couple to one or more permanent anchors of the truck bed, and
      a plurality of holes positioned along a length of the fabric body to provide additional anchor points for the truck bed.

2. The tie-down anchor apparatus of claim 1, wherein the plurality of anchor devices are coupled to one another via at least one securement device, the securement device coupled to at least one of the plurality of holes of each of the plurality of anchor devices to secure the cargo to the truck bed.

3. The tie-down anchor apparatus of claim 1, wherein the at least one of the plurality of anchor devices is configured to extend along the perimeter wall defining the length of the truck bed, and at least another one of the plurality of anchor devices is configured to extend along the perimeter wall defining the width of the truck bed.

4. The tie-down anchor apparatus of claim 1, wherein a first pair of anchor devices of the plurality of anchor devices are configured to extend along a first pair of perimeter walls defining the length of the truck bed, and a second pair of anchor devices of the plurality of anchor devices are configured to extend along a second pair of perimeter walls defining the width of the truck bed.

5. The apparatus of clam 1, wherein a tarp is removeably coupled to at least one of the plurality of holes of each of the plurality of anchor devices, and the tarp is adapted to substantially cover a cavity of the truck bed.

6. The apparatus of claim 1, wherein the second clasp is coupled to the tie-down hardware device.

7. The apparatus of claim 1, wherein the second clasp is coupled to a first end of a connecting fabric or connecting piece, and a second, opposite end of the connecting fabric or connecting piece is coupled to the tie-down hardware device.

8. The apparatus of claim 1, wherein the diameter of at least one of the plurality of holes of each of the plurality of anchor devices is greater than one half of the width w of the fabric body, and the at least one hole is secured by grommets.

9. The apparatus of claim 1, wherein the plurality of holes of each of the plurality of anchor devices comprises a first pair of adjacent holes that are spaced apart from one another between one (1) inch and four (4) inches, and a second pair of adjacent holes that are spaced apart from one another between six (6) inches and twenty (20) inches.

10. A truck bed tie-down anchor kit, comprising:
a plurality of truck bed tie-down anchor components packaged together for sale to consumers; and
wherein the truck bed tie-down anchor components comprises
a first pair of anchor devices configured to removeably couple to one another to secure cargo to a truck bed, and at least one of the first pair of anchor devices is configured to extend along a perimeter wall associated with a length or a width of the truck bed, wherein each of the anchor devices includes
a fabric body having a first end,
a first clasp coupled to the first end of the fabric body and a first end of the anchor device,
a tie-down hardware device coupled to the fabric body and configured to adjust a length of the fabric body,
a second clasp coupled to a second end of the anchor device, wherein the first clasp and the second clasp are each configured to removeably couple to one or more permanent anchors of the truck bed, and
a plurality of holes positioned along a length of the fabric body to provide additional anchor points for the truck bed.

11. The kit of claim 10, wherein the truck tie-down anchor components further comprises:
a second pair of anchor devices that are shorter in length than the first pair of anchor devices.

12. The kit of claim 11, wherein the first pair of anchor devices are configured to extend along a first pair of perimeter walls associated with the length of the truck bed, and the second pair of anchor devices are configured to extend along a second pair of perimeter walls associated with the width of the truck bed.

13. The kit of claim 10, wherein the plurality of holes are secured by grommets, and the tie-down hardware device can be placed into either an open state or a closed state, the open state allowing the length of the fabric body to be adjusted, and the closed state restricting adjustment of the length of the fabric body.

14. A tie-down anchor apparatus, comprising:
an anchor device configured to secure cargo to a truck bed and adapted to removeably couple to other anchor devices, the anchor device including
a fabric body having a first end and a second end,
a first clasp coupled to a first end of the anchor device,
a tie-down hardware device coupled to the fabric body and configured to adjust a length of the fabric body,
a second clasp coupled to a second end of the anchor device, wherein the first clasp is configured to removeably couple to a first permanent anchor point located on an interior perimeter wall of the truck bed, the second clasp is configured to removeably couple to a second permanent anchor point located on the interior perimeter wall of the truck bed, and the tie-down hardware device is further configured to adjust tension in the fabric body so that the anchor device rests substantially against the interior perimeter wall of the truck bed, and
a plurality of holes positioned along a length of the fabric body to provide additional anchor points for the truck bed.

15. The apparatus of claim 14, wherein the plurality of holes are operative to allow connectivity with another anchor device.

16. The apparatus of clam 14, wherein a tarp is removeably coupled to at least one of the plurality of holes of the anchor device, and the tarp is adapted to substantially cover a cavity of the truck bed.

17. The apparatus of claim 14, wherein the diameter of at least one of the plurality of holes of the anchor device is greater than one half of the width w of the fabric body, and the at least one hole is secured by grommets.

18. The apparatus of claim 14, wherein the plurality of holes of the anchor device comprises a first pair of adjacent holes that are spaced apart from one another between one (1) inch and four (4) inches, and a second pair of adjacent holes that are spaced apart from one another between six (6) inches and twenty (20) inches.

19. The apparatus of claim 14, wherein the first clasp is coupled to the first end of the fabric body, the second end of the fabric body passes through the tie-down hardware device, and the second clasp is coupled to the tie-down hardware device.

20. The apparatus of claim 19, wherein the second clasp is coupled to the tie-down hardware device by coupling the second clasp to a first end of a connecting fabric or connecting piece, and coupling a second, opposite end of the connecting fabric or connecting piece to the tie-down hardware device.

* * * * *